United States Patent [19]

Hutchin

[11] Patent Number: 4,488,172
[45] Date of Patent: Dec. 11, 1984

[54] METHOD AND APPARATUS FOR RANGE IMAGING

[75] Inventor: Richard A. Hutchin, Marlboro, Mass.

[73] Assignee: Novon, Inc., Swampscott, Mass.

[21] Appl. No.: 409,344

[22] Filed: Aug. 18, 1982

[51] Int. Cl.³ .............................................. H04N 7/18
[52] U.S. Cl. ....................................... 358/107; 356/4; 356/4.5; 250/236
[58] Field of Search ................ 358/107; 356/151, 152, 356/374, 3, 4, 4.5; 250/236, 237

[56] References Cited

U.S. PATENT DOCUMENTS

| | | | |
|---|---|---|---|
| 3,348,050 | 10/1967 | Bez | 356/4 |
| 3,369,445 | 2/1968 | Kohl | 356/3 |
| 3,485,560 | 12/1969 | Gamertsfelder | 356/151 |
| 3,649,754 | 3/1972 | Macovski | 358/107 |
| 3,799,675 | 3/1974 | Johnson et al. | 356/152 |
| 3,866,052 | 2/1975 | DiMatteo et al. | 250/558 |
| 3,879,133 | 4/1975 | Mathieu | 358/107 |
| 3,943,278 | 3/1976 | Ramsey, Jr. | 358/107 |
| 3,944,821 | 3/1976 | Pierrat | 356/151 |
| 3,945,729 | 3/1976 | Rosen | 356/5 |
| 4,145,991 | 3/1979 | DiMatteo et al. | 356/375 |
| 4,159,522 | 6/1979 | Zamoni | 358/107 |
| 4,240,745 | 12/1980 | Green | 358/107 |
| 4,254,433 | 3/1981 | Dewar, Jr. et al. | 358/107 |
| 4,259,017 | 3/1981 | Ross et al. | 356/375 |
| 4,410,787 | 10/1983 | Kremers et al. | 358/107 |

OTHER PUBLICATIONS

Duda et al, "Use of Range and Reflectance Date to Find Planar Surface Regions", vol. PAMI-1, No. 3, Jul. 1979.
Nitzan et al, "The Measurement and Use of Registered Reflectance and Range Data in Scene Analysis", *Proceedings of the IEEE,* vol. 65, No. 2, Feb. 1977.
Nevatia et al, "Structured Descriptions of Complex Objects", *Proc. 3rd Int. Joint Conf. Artificial Intelligence,* Aug. 1973.
Shirai et al, "Recognition of Polyhedrons With a Range Finder", *Proc. 2nd Int. Joint Conf. Artificial Intelligence,* Sep. 1971.
Rocker et al, "Methods for Analyzing Three Dimensional Scenes", *Proc. 4th Int. Joint Conf. Artificial Intelligence,* Sep. 1975.

*Primary Examiner*—Howard W. Britton
*Assistant Examiner*—Edward L. Coles
*Attorney, Agent, or Firm*—Cushman, Darby & Cushman

[57] ABSTRACT

A range imaging system in which a moving periodic pattern is projected onto the scene to be imaged. The phase by which variations in range cause portions of the pattern to shift are monitored to develop range data. A television camera offset from the axis of illumination generates four frames of intensity values. The moving pattern shifts one-quarter cycle with respect to the pattern between each of the frames. The data from the third frame is subtracted from the first frame and the data from the fourth frame is subtracted from the data of the second frame to cancel the effects of background illumination. The first difference represents a sine signal and the second difference represents a cosine signal. The arc tangent of the quotient of these values represents the phase, and thus the relative range of various points in the image. The moving pattern can be generated by either a translating plate or rotating disk which has a periodic variation in transmissiveness. An ambiguity exists when a change in range causes the phase to shift by one complete cycle. By employing a second moving pattern projected on the scene with a larger spatial period, the range in which no ambiguity occurs can be increased.

42 Claims, 10 Drawing Figures

METHOD AND APPARATUS FOR RANGE IMAGING

BACKGROUND OF THE INVENTION

1. Field Of The Invention

The present invention relates to the imaging arts, and more particularly, to range imaging employing parallax.

2. Description Of Prior Art

The use of robots in industry is becoming more and more common. Most of the robot applications are limited to simple tasks such as spray painting, welding and material handling. A broader range of applications will depend on technological developments in several areas, one of which is the improved performance of visual sensors.

The technology for building robots has been available for at least two decades. The mechanics of moving a suitable manipulator through three dimensional space is well known technology in which improvements are incremental and evolutionary. The developments in robots have been paced by the application of electric/electronic control technology to the industrial environment. The first robots were simple and not easily reprogrammable. With the advent of microprocessors and the lead of Japanese robotics, American manufacturers have been compelled to use robots to improve productivity.

Many of the robots available today are targeted for simple, restrictive tasks which require repetitive non-adaptive control. The typical installation incurs a hidden cost which is larger than the unit cost of the robot itself because of the special peripheral jigging required to support the robot. A reliable, easy to use vision system which endows the robot with more flexibility in coping with a human-like environment would eliminate these additional system costs. Such a system would also broaden the application of robots into more complex operations such as assembly which constitutes a far larger percentage of tasks in American factories than welding and spray painting.

Robot vision is an old problem which has been attacked by trying to imitate the human visual process. While steady progress has been made, it has been slow and requires a basic theoretical breakthrough before vision reaches its full potential in robotics. The current state-of-the-art is just entering real-time gray scale processing for robots and has been only marginally useful in military reconnaissance and industry.

One symptom of the present difficulties in robot vision is that most applications require special development such as tailored lighting and custom computer software. System costs are often high and response times are slow. While some companies are promising general vision capability, a little exploration reveals improved processing capabilities in two-dimensional imaging limited by the same fundamental problems.

For instance, imagine a robot staring into a barrel of parts which have various maskings, labels, shadows and contours. The first step in currently available vision processors is to partition the image into regions of "sameness" or "blobs". The definition of "sameness" might be based upon intensity, color or texture in conventional image processing, but the result upon real images is generally the same—confusion! An image is broken up into many regions of highlights, shadows and contours which are useless to the robot without further processing. Even a human often has difficulty recognizing a scene from this first level partitioning.

Not only is the image partitioning difficult to use, but it is very expensive and slow to produce. Simple level slicing or binary imaging is pointless, except when special lighting and background can be used. Thus, serial processing is generally required, involving complex logic and creating a severe bottleneck.

To overcome the problems inherent with intensity imaging or the like, range imaging has been employed. Time-of-flight systems employ a difference in phase between reflected light and reference light to determine the length of time for transmitted light to be reflected back as an indication of range. Such systems are described in U.S. Pat. No. 3,945,729 to Rosen, Duda et al "Use Of Range And Reflectance Date To Find Planar Surface Regions", *IEEE Transactions On Pattern Analysis And Machine Intelligence,* Vol. PAMI-1, No. 3 July 1979, and Nitzan et al, "The Measurement And Use Of Registered Reflectance And Range Data In Scene Analysis", *Proceedings Of The IEEE,* Vol. 65, No. 2 February 1977. Such systems are inadequate for robot control, since scanning systems are too slow as well as generally inaccurate and without sufficient resolution.

Range imaging may also be conducted employing parallax. Stereo correlation systems and scanning sheet of light systems may both be considered parallax systems. Stereo correlation is slow because of its software processing load and low resolution, since it must match many pixels to get one range measurement. It also requires object structure to make the range measurement which is a major weakness for a robot sensor which is required to manipulate unmarked objects.

Range sensors, based on the sheet of light technique are described in Nevatia et al, "Structured Descriptions Of Complex Objects", *Proc.* 3rd Int. Joint Conf. Artificial Intelligence, August 1973 and Shirai et al, "Recognition Of Polyhedrons With A Range Finder", *Proc.* 2nd Int. Joint Conf. Artificial Intelligence, September 1971. In theory, sheet of light systems can be made fast, but in practice they are slow. To achieve a narrow, scanning sheet of light a few meters away requires a laser beam which is either limited to a few milliwatts or is extraordinarily expensive. The low power illumination forces a slow scan rate to achieve an adequate signal-to-noise ratio. The sensor must measure the time at which each pixel is illuminated, and this time is directly translatable into pixel range. This measurement is slow, since a full frame is required for each position of the laser beam illumination line. One could conceive of having more than one illumination line appear on each frame to speed up the process, but one would still have to repeat the scan many times in synchronization with the TV camera to cover the entire image.

Rocker et al in "Methods For Analyzing Three Dimensional Scenes", *Proc.* 4th Int. Joint Conf. Artificial Intelligence, September 1975, suggests employing an optical grid projected onto a scene to be imaged. However, this article suggests that processing can be done by tracing the images of the intersecting lines in the picture. Computation of three-dimensional coordinates can be done only if it is possible to identify the images of the lines by their mathematical equations. The article indicates that it takes the computer about thirty seconds to determine the complete three-dimensional coordinates of the lines. In many applications, including robotics, this period of time may be excessively long.

SUMMARY OF THE INVENTION

The present invention overcomes the problems identified above with prior range imaging systems using a standard television camera, a special illuminator, and a special purpose real-time image processor to provide high frame rate range imaging. The image processing is based on high speed interferometry and is made economically feasible by the constant decline in the cost of digital memories which store whole frames of visual data.

In the present invention, a moving periodic pattern is projected onto a scene. If the scene is flat, the pattern projected thereon will be uniform stripes of bright and dim areas. However, as the scene changes in range, the stripes shift in proportion to range when viewed at an angle with respect to the axis of illumination. The temporal phase of the light with respect to the periodic pattern is measured at each pixel as an indication of range.

The periodic pattern may be produced in any of a number of ways. For example, a plate having a transmissiveness which varies periodically can be moved in front of an ordinary lamp. Alternatively, a disk having a transmissiveness which varies circumferentially can be rotated in front of the lamp. These two techniques produce continuously moving patterns. A moving periodic pattern may also be produced by periodically strobing a series of stationary patterns which are phase shifted with respect to each other.

Thus, each line of the pattern may be considered as a moving sheet of light. The periodic nature of the light, however, changes the processing for measuring a time delay to measuring a phase. Since interferometers have shown that phase changes can be measured to 1/100th and even 1/1000th of a cycle (depending upon signal to noise ratio), the accuracy of range measurements is very good.

In the preferred embodiment, signal processing requires four video frames of data. By combining the four video frames appropriately, both the effects of background illumination and the effects of varying reflectivity can be eliminated.

Thus, the present invention can produce real time image frames when employing a standard television camera and has excellent accuracy and resolution, e.g., one millimeter at a 2 meter range. Furthermore, the present invention is able to produce an intensity image in perfect registration with the range image for more detailed analysis of labels, markings, defects, etc.

Also, the moving periodic pattern circumvents the problem of illuminator power, because a standard incandescent lamp may be used instead of a laser, increasing the illuminator power a thousandfold at lower cost.

Since phase change is being detected, the range data has an ambiguity. If two points are a certain distance apart in range, their periodic patterns appear to be shifted by exactly one full cycle. This ambiguity problem is resolved in the present invention by employing more than one periodic pattern in the illuminator or employing illuminators with different periodic patterns. The patterns have different spatial frequencies. The high frequency pattern is employed for accuracy, and the low frequency pattern is employed for range.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawing of, which.

DETAILED DESCRIPTION OF THE PRESENTLY PREFERRED EXEMPLARY EMBODIMENTS

Figure 1:
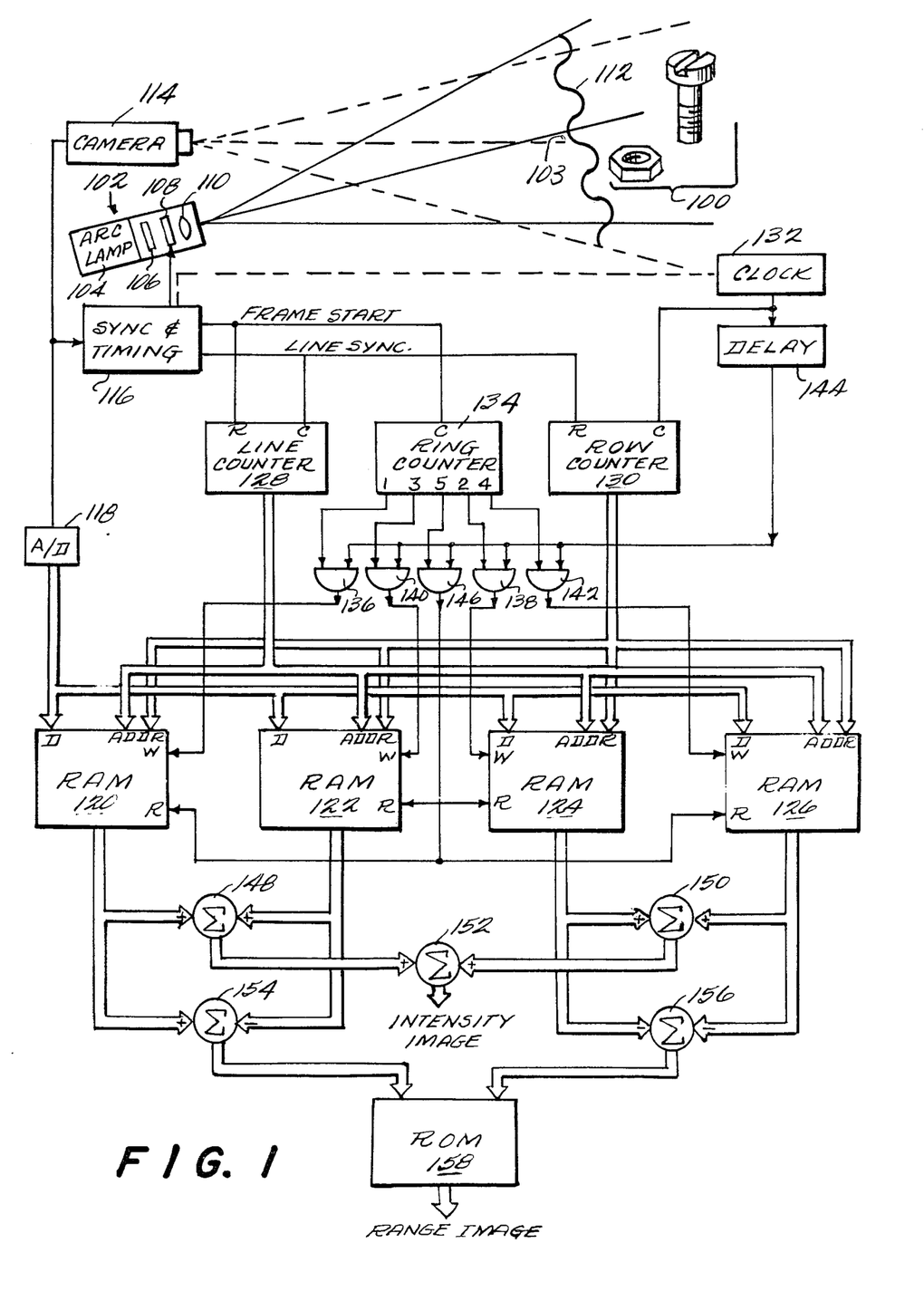
FIG. 1 is a circuit diagram of one embodiment of the present invention.

FIG. 1 illustrates a system according to the present invention for generating an image of scene 100. The scene is illuminated by illuminator 102 which includes arc lamp 104, heat filter 106, pattern generator 108 and lens 110. Pattern generator 108 produces periodic pattern 112 on scene 100. If all areas of scene 100 were the same distance from illuminator 102, scene 100 would be illuminated with uniform stripes of bright and dim areas. However, since the objects in scene 100 differ in range from illuminator 102 and the scene is viewed from an angle 103, the regions of darkness and lightness bend, and it is this bending which is employed to determine the range of objects in scene 100.

In fact, pattern generator 108 includes means for moving the pattern across scene 100. What is actually measured is the phase shift of the regions of darkness and lightness with respect to the movement of the pattern. Scene 100, as illuminated by illuminator 102, is viewed by electronic camera 114. The system does not require a high performance camera. While field distortion will be interpreted as small shape distortions, these can be calibrated out easily if required. A charge coupled device (CCD) camera would give the best scan stability and signal-to-noise ratio.

The output of camera 114 is applied to both synchronization and timing circuit 116 and analog-to-digital converter 118. Synchronization and timing circuit 116 extracts from the camera signal frame start and line synchronization signals. The video data contained in the signal from camera 114 is converted into a digital quantity by means of analog-to-digital converter 118 and applied to the data inputs of random access memories (RAMs) 120–126.

To control the address into which the data is written, line counter 128 and row counter 130 are provided. Line counter 128 counts the number of lines that have been scanned in each frame. Thus, line counter 128 is incremented by the line synchronization signal from synchronization and timing circuit 116 and reset by the frame start signal also from synchronization and timing circuit 116. Row counter 130 determines the pixel which camera 114 is scanning across the line. Thus, row counter 130 is incremented by clock 132 and reset by the line synchronization signal from synchronization and timing circuit 116. Obviously, clock 132 must be coordinated with camera 114 so that the frequency of the clock matches the speed at which camera 114 sweeps across the line. This coordination can be performed either by carefully controlling the frequency of clock 132 or by synchronizing clock 132 with synchronization and timing circuit 116 as indicated by dotted line in FIG. 1.

The output of line counter 128 forms the most significant bits of the address input of RAMs 120–126 and the output of row counter 130 forms the least significant bits of the address input.

In the preferred embodiment, range data are generated from four frames of intensity data. Between each of the four frames, pattern 112 moves one-quarter cycle. After the four frames of data have been collected, the intensity value of each pixel in the third frame is subtracted from the intensity value of the corresponding pixel in the first frame and the intensity value of each pixel in the fourth frame is subtracted from the corresponding pixel intensity value in the second frame. It should be noted that the intensity values in the first and third frames and the intensity values in the second and fourth frames represent half cycle shifts in moving pattern 112. As a result of the subtraction, any effects of background illumination are cancelled out.

Furthermore, it should be noted that the moving pattern 112 shifts one-quarter cycle between the first and second frames and the third and fourth frames. Accordingly, after these subtractions have taken place, what is left are two frames of data related to each other by a one-quarter cycle phase shift of moving pattern 112. If one set of data is plotted along the X axis and the other set of data is plotted along the Y axis, a vector is defined whose angle is uniquely related to the phase shift of moving pattern 112, and thus to the range of each particular pixel through a geometrically determined constant.

For example, if pattern 112 were actually sinusoidal, one difference frame may be considered sine data and the other frame may be considered cosine data. The sine data is then divided by the cosine data to produce a frame of values each related to the tangent of the number degrees of phase shift at each particular pixel. The arc tangent of that value is then determined which is the phase (e.g., number of degrees or the like) of periodic pattern 112 at the particular pixel. As indicated above, the phase is directly related to the range of the particular pixel through a geometrically determined constant.

Also, it should be clear that if the data of the four frames are summed, the resulting frame of values represents an intensity image.

To perform the operations referred to above, ring counter 134 has five output terminals which sequentially and individually become high in response to frame start signals applied to a clock input. Thus, at the beginning of each frame, the next output terminal of the ring counter becomes high. The first four outputs of ring counter 134 are applied to AND gates 136–142, respectively. The other inputs of AND gates 136–142 are responsive to delay circuit 144 which produces a signal having the same frequency as the output of clock 132, but delayed in phase. The outputs of AND gates 136–140 are applied to the write control inputs of RAMs 120, 124, 122 and 126, respectively.

The fifth output terminal of ring counter 134 is supplied to AND gate 146. The other input of AND gate 146 also receives the signal from delay circuit 144. The output of AND gate 146 is applied to the read terminals of RAMs 120–126.

The outputs of RAMs 120 through 126 are added together by means of summers 148–152 to produce an intensity image. The output of RAM 122 is subtracted from the output of RAM 120 by means of summer 154 and the output of RAM 126 is subtracted from the output of RAM 124 by means of summer 156. The output of summers 154 and 156 are applied to the address inputs of ROM 158. ROM 158 outputs a value which represents the arc tangent of the quotient of the values presented by summers 154 and 156. Obviously, a calculating device may be employed instead of ROM 158.

Figure 2:
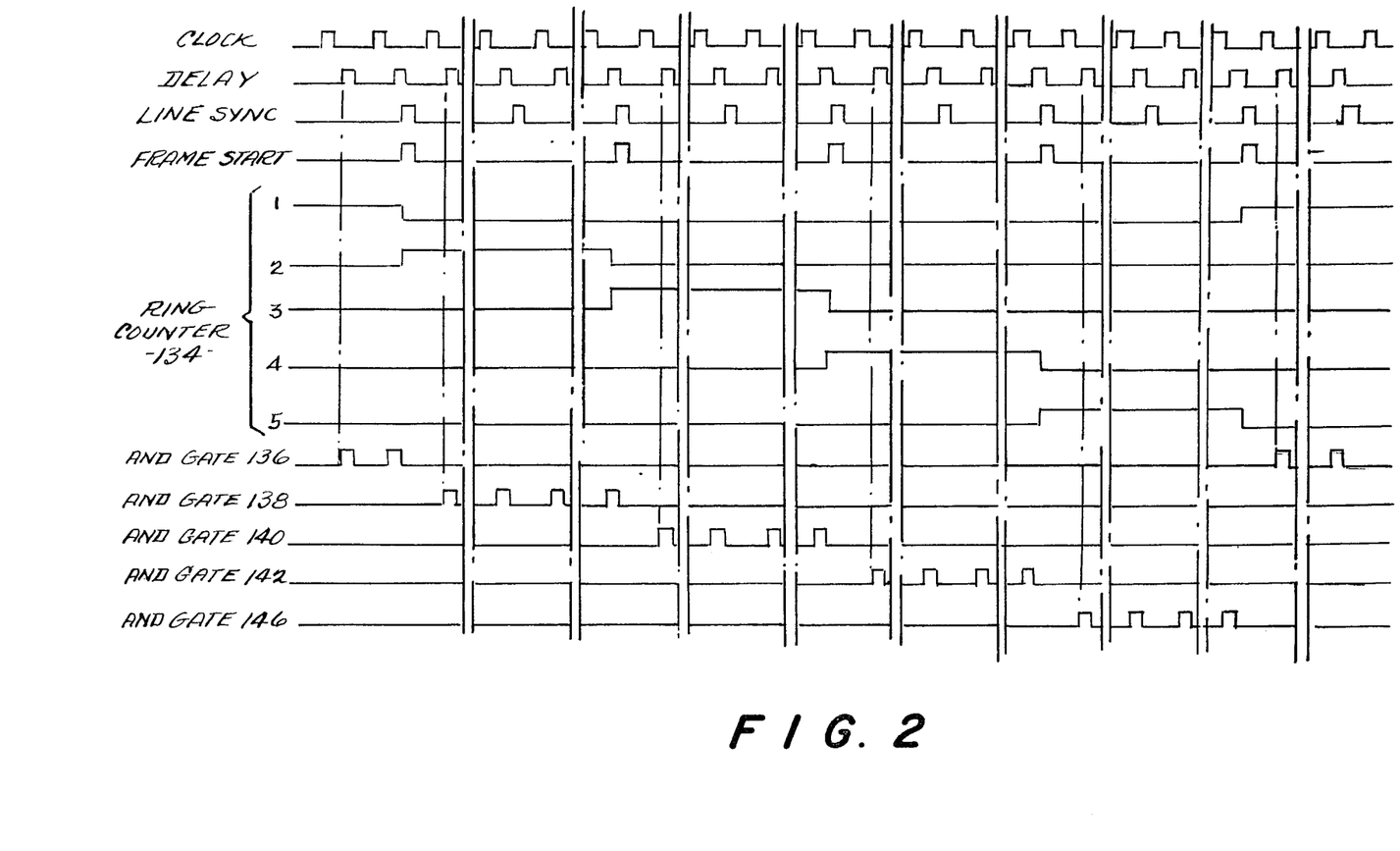
FIG. 2 is a timing diagram for the circuit of FIG. 1.

FIG. 2 is a timing diagram illustrating the operation of FIG. 1. Suppose the first output terminal of ring counter 134 is high. This causes data to be written into RAM 120.

At the beginning of the first frame, a frame start signal has reset line counter 128 and a line synchronization signal has reset row counter 130. Thereafter, clock 132 increments row counter 130 to serially address different memory locations corresponding to the pixels across the first line. At the end of the first line, the line synchronization signal causes row counter 130 to be reset and line counter 128 to be incremented so that memory locations corresponding to the second row of pixels are sequentially addressed as row counter 130 is incremented by clock 132. This process continues until the entire first frame has been scanned.

As counters 128 and 130 increment the address signal applied to RAMs 120–126, camera 114 is scanning through the frame. For each pixel, data is applied to the data input of RAMs 120–126. As soon as the address has stabilized on the output lines of counters 128 and 130, delay circuit 144 produces a pulse which passes through AND gate 136 to cause RAM 120 to write at the appropriate address the data provided at the input terminal of RAM 120. The address signal applied to RAM 120 is then incremented and the next piece of data is written into RAM 120. This process continues until the entire frame has been scanned by camera 114.

At the beginning of the next frame, the frame start signal resets line counter 128 and increments ring counter 134 so that the second output terminal becomes high. The line synchronization signal resets row counter 130. Since the second output of ring counter 134 is high, AND gate 138 passes pulses from delay circuit 144 to the write input of RAM 124. As a result, data from analog-to-digital converter 118 is written into RAM 124 in the same manner that the first frame of data was written into RAM 120.

In a similar manner, RAMs 122 and 124 are loaded with data from the third and fourth frames, respectively. At the end of this loading stage, RAMs 120–126 each contain the intensity of values for one frame. Between the loading of sequential memories, moving pattern 112 shifts one-quarter cycle.

After the fourth frame has been loaded, the next frame start signal causes the fifth output terminal of ring counter 134 to become high. As a result, pulses from delay circuit 144 are applied to the read control inputs of RAMs 120–126 through AND gate 146. At the same time, counters 128 and 130 continue to be clocked and reset in the manner described above so that the intensity values for each pixel in RAMs 120–126 are incrementally accessed. Since the output of AND gate 146 places RAMs 120–126 in a reading mode, the intensity values are outputted from RAMs 120–126. The data from the first frame in RAM 120 is applied to adding inputs of summers 148 and 154. The data from the third frame in RAM 122 is applied to an adding input of summer 148 and a subtracting input of summer 154. The difference generated by summer 154 is applied to an address input of ROM 158.

The intensity values for the pixels of the second frames stored in RAM 124 are applied to adding inputs of summers 150 and 156. The intensity values of the pixels in the fourth frame stored in RAM 126 are applied to an adding input of summer 150 and a subtracting input of summer 156. The difference generated by summer 156 is also applied to ROM 158 as another portion of the address.

The output of summers 148 and 150 are applied to summer 152. The output of summer 152 represents a sequence of the sums of the intensity values in corresponding pixels of the first through fourth frames. Thus, the output of summer 152 is an intensity image of scene 100.

The differences generated by summer 154 represent the differences of intensity values of corresponding pixels between the first and third frames. Correspondingly, the differences generated by summer 156 represent the differences in intensity values of corresponding pixels between the second and fourth frames. Thus, the output of summer 154 may be considered to be related to sine values and the output of summer 156 may be considered to be related to cosine values. ROM 158 is programmed to generate a function related to the arc tangent of the quotient of the signals provided by summers 154 and 156. That is, each conceivable combination of values produced by summers 154 and 156 address a unique location in ROM 154, in which location is stored the arc tangent of the quotient of the two address values. As indicated above, this represents a value proportional to the range of the objects in scene 100.

The division of the sine data by the cosine data causes all intensity variations related to reflectivity variations to cancel out so that the resulting value is solely related to the change in phase of moving pattern 112 caused by differences in range.

Figure 3:
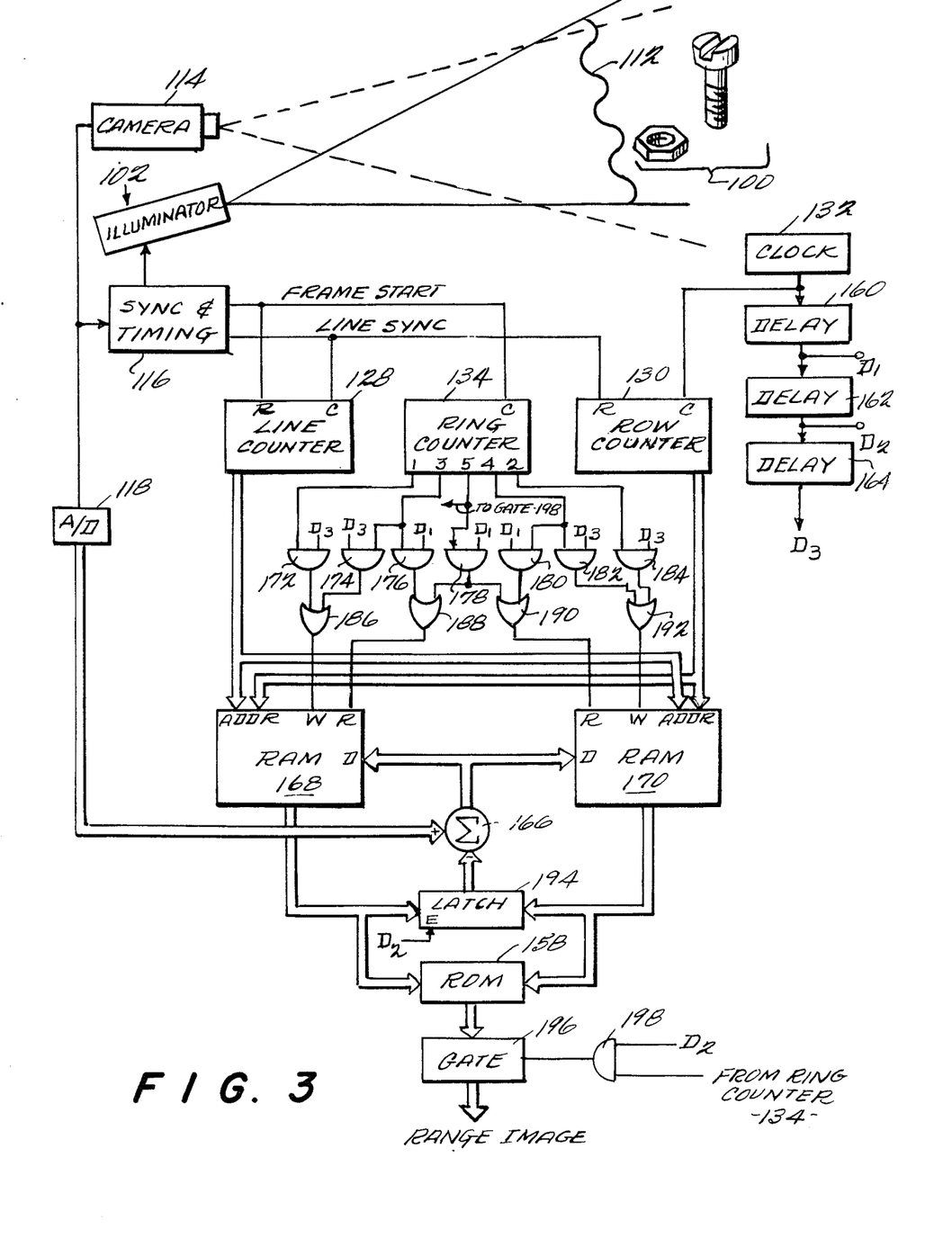
FIG. 3 is a circuit diagram of another embodiment of the present invention.
Figure 4:
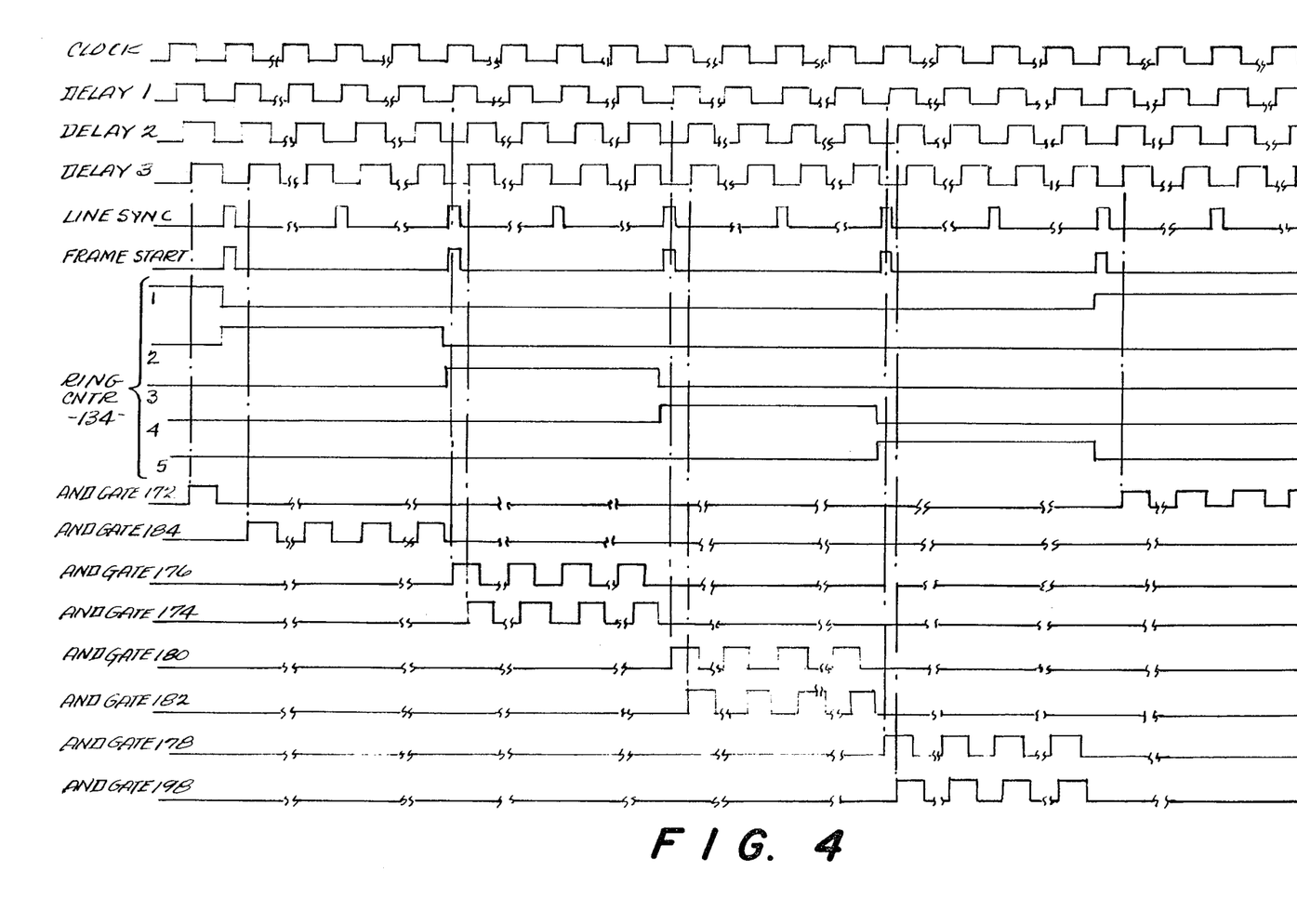
FIG. 4 is a timing diagram of the circuit in FIG. 3.

FIG. 3 illustrates another embodiment of the present invention in which the number of memories needed to store frames of intensity data is reduced. Those elements in FIG. 3 which are identical to elements in FIG. 1 are numbered accordingly. For this embodiment, as illustrated in FIG. 4, not one, but three signals with different delays with respect to the output of clock 132 are required. Thus, delay circuit 160 produces delay signal $D_1$, delay circuit 162 produces delay signal $D_2$ and delay circuit 164 produces delay signal $D_3$. Delay signals $D_1$ through $D_3$ are employed to control the timing of the various events during operation of the circuit.

Instead of being applied directly to the memories, the output of analog-to-digital converter 118 is applied to summer 166. The output of summer 166 is applied to the data inputs of random access memories 168 and 170. As with the embodiment in FIG. 1, the addressing of RAMs 168 and 170 is accomplished through counters 128 and 130. Ring counter 134, AND gates 172–184 and OR gates 186–192 control the writing into and reading from RAMs 168 and 170.

The output of RAMs 168 and 170 are applied to both latch 194 and ROM 158. When latch 194 is enabled, its inputs are stored and supplied to its output. Instead of the arrangement illustrated, each corresponding output line of RAMs 168 and 170 may be applied to an OR gate, the output of which is supplied to a more conventional latch instead of latch 194. Thus, latch 194 has two input ports which are ORed together.

The output of ROM 158 is applied to gate 196 which permits the output of ROM 158 to pass through when a high signal is applied to its controlled terminal. AND gate 198 generates the control signal by the logical combination of the output from terminal 5 of ring counter 134 and delay signal $D_2$.

The operation of FIG. 3 is illustrated by means of the timing chart in FIG. 4. At the very beginning of the first frame, counters 128 and 130 are both reset and the first output terminal of ring counter 134 is high. The output of clock 132 causes row counter 130 to be incremented so that the first address corresponding to the first pixel of the frame is applied to RAMs 168 and 170. After the address has settled, delay signal $D_3$ from delay circuit 164 passes through AND gate 172 and OR gate 186 to the write control input of RAM 168. This causes the intensity value for the first pixel which has passed through summer 166 (the output of latch 194 is 0) to be written at the corresponding address. Clock 132 then causes row counter 130 to be incremented again, so that the address corresponding to the next pixel is applied to RAMs 168 and 170. In this manner, the intensity values for the first row of pixels is stored in RAM 168.

At the end of the row, the line synchronization signal causes row counter 130 to be reset and line counter 128 to be incremented. Afterwards, the next row of intensity values are written into RAM 168. This process continues until an entire frame of values is stored in RAM 168.

With the next frame start signal, counters 128 and 130 are reset and ring counter 134 is incremented so that its second output terminal becomes high. Thereafter, a second frame of intensity values are stored in RAM 170 in that delay signal $D_3$ can pass through AND gate 184 and OR gate 192 to produce write demands for RAM 170. Thus, the second frame of data is stored in RAM 170 in the same manner that the first frame of data was stored in RAM 168.

At the end of the second frame, the frame start signal and the line synchronization signal cause counters 128 and 130 to be reset and ring counter 134 to be incremented so that its third output terminal becomes high. This high signal from ring counter 134 is supplied to AND gates 174 and 176 to permit any signals applied to the other input terminals thereof to pass through. Accordingly, when camera 114 is reading the first pixel of the frame and the corresponding address is applied to RAMs 168 and 170, delay signal $D_1$ passes through AND gate 176 and OR gate 188 to the read control input of RAM 168. This causes the intensity value of the first pixel from frame 1, previously stored in RAM 168 to be read out and applied to the input of latch 194. With the delay signal $D_2$, this intensity value is stored in latch 194. Delay signal $D_3$ then passes through AND gate 174 and OR gate 186 to the write control terminal of RAM 168. At this time, the intensity value for the first pixel of frame 3 is applied to the positive input of summer 166 and the intensity value for the first pixel in frame 1 is applied by latch 194 to the negative input of summer 166. Upon the write command, the difference is stored at the appropriate address of RAM 168.

With the next clock pulse, row counter 130 is incremented so that the address of the next pixel in RAMs 168 and 170 are addressed. After the address signal has settled, a pulse of the $D_1$ signal passes through AND gate 176 and OR gate 188 to the read control input of RAM 168. This causes the intensity value of the second pixel of the first frame to be outputted to latch 194. With the pulse of the $D_2$ signal, this value is stored in latch 194. The next pulse of the $D_3$ signal passes through AND gate 174 and OR gate 186 to the write control terminal of RAM 168 so that RAM 168 stores the difference between intensity values of the second pixel of the first and third frames. This process continues until RAM 168 stores the differences of the intensity values of the pixels in the first and third frames.

At the end of the third frame, the next frame starts and line synchronization signals again cause counters 128 and 130 to be reset and ring counter 134 to be incremented so that the fourth terminal of ring counter 134 becomes high. This enables gates 180 and 182 so that the difference in intensity values for the pixels in the second and fourth frames may be stored in RAM 170 in a manner similar to that just described with respect to the storing in RAM 168 in the difference in intensity values between the first and third frames. At the end of the fourth frame, RAMs 168 and 170 store the differences between the first and third frames and the second and fourth frames, respectively. The next frame start signal and line synchronization signal causes counters 128 and 130 to be reset and ring counter 134 to be incremented so that the fifth output terminal becomes high. This high signal enables AND gate 178. Upon the next clock pulse from clock 132, row counter 130 is incremented so that RAMs 168 and 170 are caused to address the location in which data for the first pixels are stored. As soon as the address signal has settled, a pulse from the $D_1$ signal passes through AND gate 178 and OR gates 188 and 190 to cause RAMs 168 and 170 to read out the difference values stored therein. These values are applied to the address inputs of ROM 158. As before, ROM 158 generates a value related to the arc tangent of the quotient of these address signals. Since the high output signal on the fifth terminal of ring counter 134 also enables AND gate 198, the next pulse of the $D_2$ signal causes gate 196 to pass the output of ROM 158 to its output. This output represents the relative range of the object of scene 100 in the first pixel location.

With the next clock pulse, the second pixel of data is read out of RAMs 168 and 170 and the range is calculated. This process continues until the entire frame has been so processed.

Figure 5:
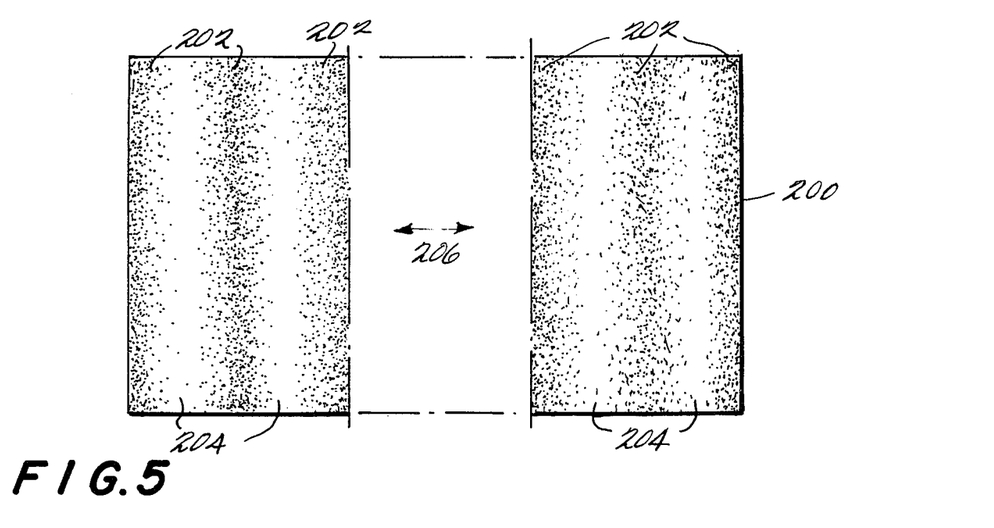
FIG. 5 is a top plan view of a periodic pattern generating plate according to the present invention.

As indicated above, an important aspect of the present invention is the generation of the moving periodic pattern projected onto scene 100. In the preferred embodiment, the pattern is generated by a plate placed in front of arc lamp 104 whose transmissiveness varies along one direction. Thus, as illustrated in FIG. 5, plate 200 of pattern generator 108 has regions 202 of relatively low transmissiveness alternated with regions 204 of high transmissiveness. Such plates are well known in the art as exemplified by the Rocker et al article, supra. The transmissiveness of plate 200 varies sinusoidally along direction 206. Sinusoidal variation is ideal since the arc tangent function is employed to determine the phase shift of the bright and dark regions.

Figures 6, 7:
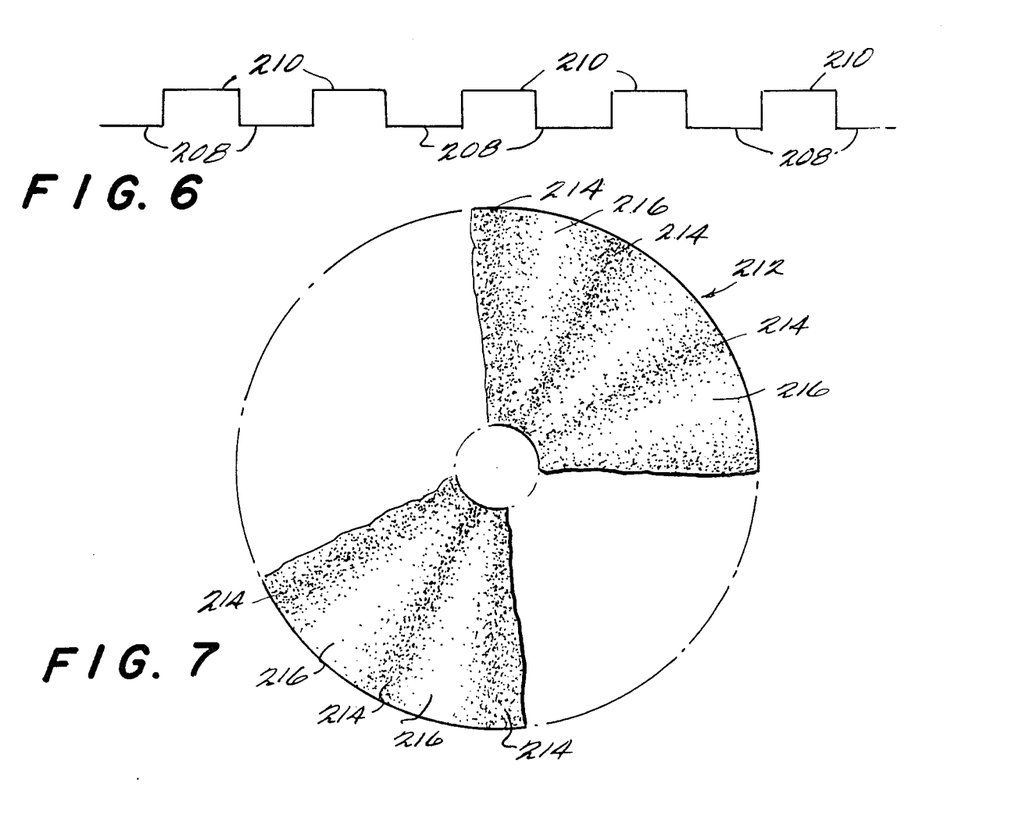
FIG. 6 is a graph of an alternate transmissiveness pattern for the plate of FIG. 5.
FIG. 7 is a top plan view of a periodic pattern generating disk according to the present invention.

However, alternative approximations for a sinusoidal variation may be employed. Thus, FIG. 6 is a chart illustrating the variations of transmissiveness along direction 206 in an alternative embodiment of plate 200. In FIG. 6, regions 208 are much less transmissive than regions 210. If a plate with a transmissiveness which varies in accordance with FIG. 6 is projected slightly out of focus onto scene 100, the resulting pattern of bright and dark areas varies approximately sinusoidally. A plate made in accordance with the transmissiveness function of FIG. 6 may simply consist of a glass plate with either opaque or partially transmissive regions painted thereon.

As indicated above, the movement of the pattern generator such as plate 200 must be synchronized with camera 114. Specifically, for each frame scanned by camera 114, plate 200 must shift 90° with respect to the pattern of transmissiveness. Obviously, the pattern in FIG. 5 is greatly enlarged to show more clearly the nature thereof. So that a standard camera may be employed, it is necessary to synchronize the movement of plate 200 with signals produced by camera 114. The synchronization of movement of an object with respect to a series of pulses is well known in the art, and therefore is not described in detail herein. For example, plate 200 may be driven by a loosely coupled stepper motor in a conventional manner.

However, a problem exists with respect to the embodiment illustrated in FIG. 5. If a simple plate is employed, eventually the end of the plate is reached and the plate must return to its original position. In order to alleviate this problem, pattern generator 108 may include a disk 212 as illustrated in FIG. 7. Arranged circumferentially about the disk are regions 214 of low transmissiveness and regions 216 of high transmissiveness. The problem with the use of disk 212 is that the pattern projected therethrough will not produce parallel lines due to the radial nature of the pattern on disk 212. However, if disk 212 is made large and the area illuminated by arc lamp 104 is fairly small and at the outer periphery of the disk, the pattern projected will be sufficiently parallel to obtain accurate measurements. Otherwise, it is well within the level of skill in the art to provide correction to the data to overcome this problem. As is well known by those skilled in the art, however, the problem of synchronizing the rotation of disk 112 with camera 114 is much simplified. Again, a loosely coupled stepper motor may be employed.

The two techniques discussed above produce continuously moving patterns. A moving periodic pattern may also be produced by periodically strobing a series of stationary patterns which are phase shifted with respect to each other.

As explained in detail above, the system according to the present invention measures the phase shift of the moving pattern which results from variations in range. If a sudden range variation exists which produces exactly one full cycle of shift in the pattern, the system will not be able to differentiate the shift. Thus, there is an ambiguity in the range data. The continuity of the surfaces must be employed to resolve this ambiguity.

As an example, suppose the system has a one millimeter or better range accuracy with an ambiguity in depth of field of 20 centimeters. Thus, a pixel 20 centimeters behind another pixel will have the same range measurement. In many applications, this ambiguity is of no problem since surfaces can be used to resolve the ambiguity.

However, steps may be taken to widen the depth of field in which there is no ambiguity. As is done in interferometry, the range before ambiguity occurs can be increased by employing more than one period in the patterns projected onto scene 100. The period of the pattern is directly related to the range within which ambiguity does not occur. Thus, a larger period pattern can be employed to locate the range of an object in scene 100 and the smaller period pattern may be employed as "fine tuning" to more precisely identify the location of the object. The application of patterns with different periods may be accomplished either by employing two illuminators or by employing a pattern generator plate which has a transmissiveness pattern that varies at two frequencies simultaneously.

Figure 8:
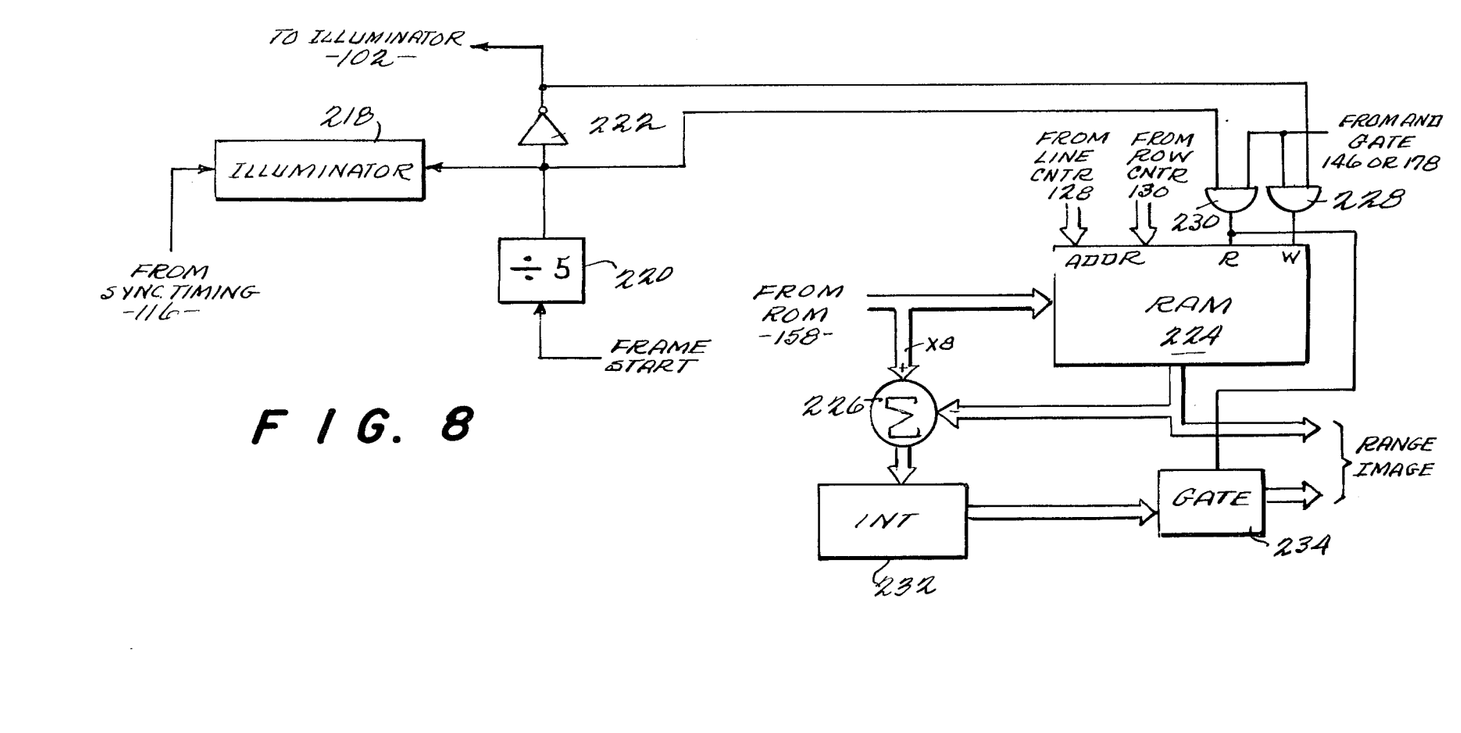
FIG. 8 is a diagram of a circuit to increase the range in which no ambiguity occurs.

FIG. 8 illustrates a circuit which may be added onto the circuit of either FIG. 1 or FIG. 3 to widen the range in which ambiguity will not occur. In the system illustrated in FIG. 8, a second illuminator 218 is employed. Illuminator 218 produces a pattern whose period is eight times that of illuminator 102. Thus, with this system, the range in which no ambiguity exists increases by a factor of eight. Obviously, by adjusting the ratio of spatial periods between the two illuminators, any improvement in the range of no ambiguity may be obtained. However, the range may not be increased by so large an extent that it is not clear in what portion of the broader range the high frequency data is situated. In general, the periods must be selected so that the coarse accuracy must be better than one-half of a cycle of the fine periodic pattern. Otherwise, ambiguity will exist as to where in the coarse pattern the high accuracy data lies.

Since illuminator 218 produces a spatial pattern which has a period eight times that of illuminator 102, unless a change is made, it will take eight times longer to collect data when illuminator 218 is employed. To overcome this problem, the periodic pattern projected by illuminator 218 moves eight times faster than the pattern projected by illuminator 102. Therefore, the temporal frequency of illuminator 218 is the same as that of illuminator 102.

As indicated above, in this embodiment, illuminator 102 and illuminator 218 operate alternately. Therefore, in addition to the signal from synchronization and timing circuit 116, a signal must also be provided for turning on and off illuminators 102 and 218. To accomplish this, FIG. 8 illustrates divider 220 which is incremented by the frame start signal. This is a divide-by-5 counter so that after every five frame start pulses, its output changes state. The output of divider 220 is supplied to illuminator 218 directly and to illuminator 102 through inverter 222. Thus, typically, illuminator 102 will be on first for five frames and then illuminator 218 will be on for five frames.

In this embodiment, the arc tangent data from ROM 158 is applied both to RAM 224 and the adding input of summer 226. For this embodiment, ROM 158 outputs a value between 0 and 1. RAM 224 is controlled by write signals from AND gate 228 and read signals from AND gate 230. The output of RAM 224 is applied to the subtracting input of summer 226. The output of summer 226 is applied to integer function generator 232, the output of which is applied to gate 234. The range image is simply the output of gate 234 and the output of RAM 224.

In operation, at the beginning of the first frame, the output of divider 220 is low so that illuminator 102 is actuated. The system illustrated in either FIG. 1 or FIG. 3 then collects data as described above from the four frames. In the fifth frame, as data is being read out and processed by ROM 158, the signal from inverter 222 and the signal from either AND gate 146 or 178 (depending on whether the FIG. 1 or FIG. 3 embodiment is being employed) is logically combined by AND gate 228 to produce a high signal. Accordingly, the data from ROM 158 is written into RAM 224 at an address related to the pixel from which the data was obtained. At the end of the fifth frame, RAM 224 is fully loaded with the high accuracy arc tangent data from ROM 158.

With the next frame start signal, the output of divider 220 becomes high, so that illuminator 218 is actuated. During the next four frames, data is collected in the manner described above with respect to either FIG. 1 or FIG. 3.

During the next frame, the second set of data is processed by ROM 158. This data is applied, one pixel at a time, to summer 226. Before it is applied to summer 226, it is multiplied by 8, the ratio of the spatial periods of the patterns projected by illuminators 102 and 218. This multiplication operation is accomplished simply by shifting the data by three bits in a conventional, well known fashion. As the data from each pixel is applied to summer 226, fine data from the corresponding pixel is read out from RAM 224 under control of AND gate 230. The fine data is subtracted from the coarse data in summer 226 and presented to integer function generator 232. Function generator 232 simply eliminates all digits to the right of the decimal (or more correctly, binary) point. Since gate 234 is actuated by the read control signal from AND gate 230, data from function generator 232 passes directly through gate 234 and forms the higher order bits of the range image data. The lower order of bits are obtained directly from the high accuracy data stored in RAM 224. Thus, the resulting range image data includes both a large range in which no ambiguity exists and high accuracy simultaneously.

Figure 9:
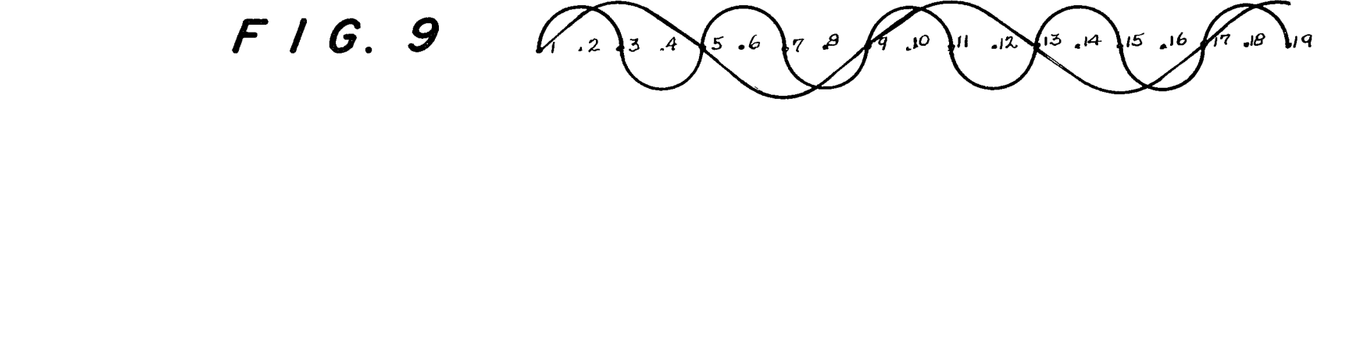
FIG. 9 is a schematic illustration of the relationship between two periodic patterns which may be used simultaneously in an embodiment of the present invention.
Figure 10:
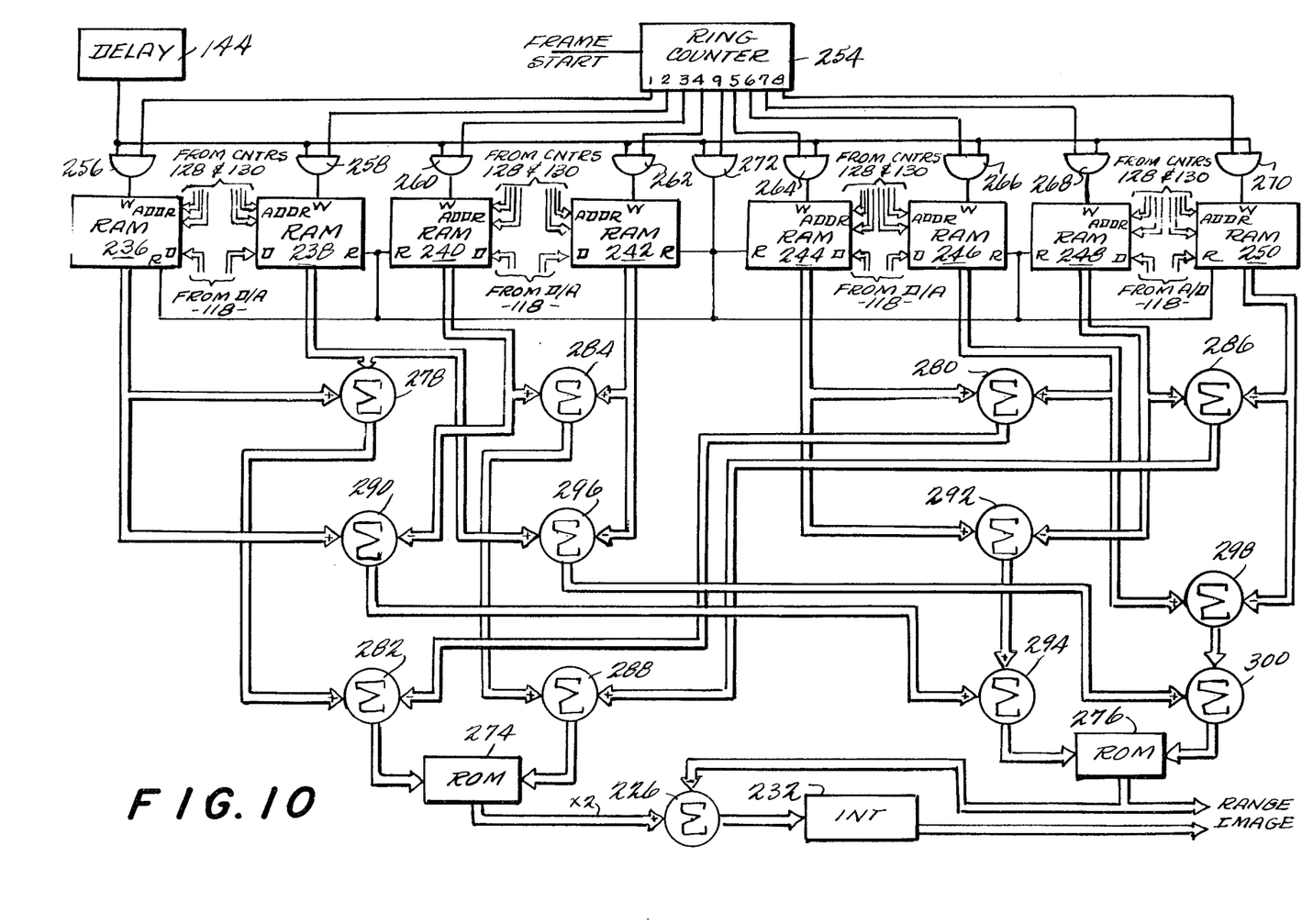
FIG. 10 is a diagram of another circuit to increase the range in which no ambiguity occurs.

An alternate approach is illustrated in FIGS. 9 and 10. In this embodiment, instead of employing two illuminators, a single illuminator projects a pattern consisting of the superposition of two periodic patterns of differing frequencies. In this embodiment, let us assume that one pattern has a period twice that of the other. Therefore, the range of no ambiguity is extended by a factor of two. Again, this range can be increased by adjusting the ratio of the periods of the patterns. Such patterns are illustrated in FIG. 9. A range image which both has the larger range of no ambiguity and high accuracy can be obtained by monitoring the intensities during the first eight quarter cycle shifts of the high frequency pattern.

Thus, FIG. 10 represents a variation of the embodiment illustrated in FIG. 1. Data is provided to RAMs 236–250 from digital-to-analog converter 118 illustrated in FIG. 1. The addressing of RAMs 236–250 is controlled in a manner similar to the embodiment in FIG. 1 by counters 128 and 130.

Instead of a five output terminal ring counter employed in the embodiment in FIG. 1, the embodiment in FIG. 10 utilizes a nine step ring counter 254. Each of output terminals 1–8 are connected to the write control input of one of RAMs 236–250, respectively, through AND gates 256–270. The other input terminal of each of AND gates 256–270 is connected to delay circuit 144. The ninth output terminal of ring counter 254 is connected through AND gate 272 to the read control terminals of RAMs 236-250.

Thus, under control of ring counter 254, during the first eight frames of scanning, intensity data is loaded into RAMs 236-250 in a manner identical to the loading of data in FIG. 1. During the ninth frame, data is read out from RAMs 236-250 and is processed by the remaining circuitry illustrated in FIG. 10.

Since both the high frequency and the low frequency patterns are varying simultaneously, it is necessary to eliminate the effect of variations in the high frequency pattern when coarse data is being obtained, and conversely, it is necessary to eliminate the effects of variations in the low frequency pattern when fine data is being obtained. The effects of each pattern on the other can be cancelled with the eight frames of data that are collected. Specifically, it has been determined that if the following equations are employed to derive the phase data, the influences of each pattern on the other will be cancelled:

Fine phase data = arc tan$[((1-3)+(5-7))/((2-4)+(6-8))]$

Coarse phase data = arc tan$[((1+2)-(5+6))/((3+4)-(7+8))]$

The numbers in the equations above refer to frames. Specifically, the numbers refer to the intensity data in the corresponding frames taken around the similarly numbered points in FIG. 9. Thus, the data from frames 1-8 are stored in RAMs 236-250, respectively. It is necessary to separately perform the calculations set forth above for each of the pixels in the frame.

These calculations occur as intensity data for each pixel is sequentially read out of RAMs 236-250 under control of ring counter 254 and counters 128 and 130. Read only memory 274 generates the coarse data and read only memory 276 generates the fine data. As in previous embodiments, each of ROMs 274 and 276 are addressed with the numerator and denominator of the above equations and the value that is read out from ROMs 274 and 276 represent the arc tangent of the quotient of the applied values. Thus, in order to obtain the coarse data, summer 278 generates a value related to the sum of the intensity values for each pixel in frames 1 and 2 from RAMs 236 and 238. Summer 280 produces values related to the sum of the intensity values of frames 5 and 6 from RAMs 244 and 246. The values generated by summer 280 are subtracted from the values generated by summer 278 in summer 282. The output of summer 282 is the numerator of the coarse data equation set forth above and is applied as a portion of the address for ROM 274.

Summer 284 generates values related to the sum of the intensity values of frames 3 and 4 obtained from RAMs 240 and 242. Summer 286 produces values related to the sum of the intensity values of frames 7 and 8 stored in RAMs 248 and 250. The values generated by summer 286 are subtracted from the values generated by summer 284 in summer 288. The resulting values correspond to the denominator of the coarse data equation set forth above and are applied to ROM 274 as the remainder of the address. As indicated previously, ROM 274 outputs a value related to the arc tangent of the quotient of the values produced by summers 282 and 288.

Summer 290 generates the difference in the intensity values between frames 1 and 3 stored in RAM 236 and 240. Summer 292 generates the difference in the intensity values between frames 5 and 7 stored in RAMs 244 and 246. The values generated by summers 290 and 292 are added in summer 294. The resulting value represents the numerator of the fine data equation set forth above and is applied to ROM 276 as a portion of the address.

Summer 296 generates values related to the difference between the intensity data of frames 2 and 4 stored in RAMs 238 and 242. Summer 298 generates the difference between the intensity values of frames 6 and 8 stored in RAMs 246 and 250. Summer 300 generates values related to the sum of the outputs of summers 296 and 298. These values are also applied to ROM 276 as a portion of the address thereof. These values represent the denominator of the fine data equation set forth above.

As with ROM 158 in the previous embodiments, ROMs 274 and 276 produce values between 0 and 1. As with the embodiment illustrated in FIG. 8, it is necessary to combine the outputs of ROMs 274 and 276 to produce a single range value which reflects both the increase range of no ambiguity and high accuracy. Accordingly, the outputs of ROMs 274 and 276 are applied to summer 226. Before being applied to summer 226, the output of ROM 274 is multiplied by 2 by shifting the data by one bit. The output of ROM 276 is applied to a subtracting input of summer 226. The resulting difference is applied to integer function generator 232 which eliminates digits to the right of the decimal (or more correctly, binary) point. The remaining value represents the most significant bits of the resulting image data. The least significant bits are obtained directly from ROM 276.

Although only a few exemplary embodiments of this invention have been described in detail above, those skilled in the art will readily appreciate that many modifications are possible in the exemplary embodiments without materially departing from the novel teachings and advantages of this invention. For example, those skilled in the art will readily appreciate that the addressing of the frame storing RAMs and the control of the read/write functions can be accomplished by a computer. In fact the same computer could also take the output of the RAMs and perform the computation to generate the range data. If a computer is employed, those skilled in the art will realize that the circuitry and timing diagrams shown in the figures can easily be interpreted as flow charts to enable those skilled in the art to make and use this invention with a computer.

Accordingly, all such modifications are intended to be included within the scope of this invention as defined in the following claims.

What is claimed is:

1. Apparatus for imaging a scene comprising:
   means for illuminating said scene with a single moving periodic modulation pattern;
   means, offset from said illuminating means, for converting light reflected from a plurality of points in said scene into electrical signals; and
   means for determining the relative phase with respect to said periodic modulation pattern of light reflected from each of said points in said scene using a plurality of said electrical signals for each of said points generated at different times, said relative phase being related to the relative range of said points.

2. Apparatus as in claim 1 wherein said converting means includes an electronic camera.

3. Apparatus as in claim 1 wherein said determining means includes a computer responsive to said converting means.

4. Apparatus for creating an image of a scene, said image including a plurality of pixels, each pixel being associated with an area of said scene, said apparatus comprising:
means for illuminating said scene with a single moving periodic modulation pattern;
means, offset from said illuminating means, for generating intensity values for each of said pixels related to the amount of light reflected from said scene; and
means for determining the relative phase with respect to said periodic modulation pattern of light reflected from each of said areas in said scene using a plurality of frames of said intensity values, said moving pattern having shifted in phase between consecutive ones of said plurality of frames, said relative phase being related to the relative range of said areas.

5. Apparatus as in claim 1 or 4 wherein said illuminating means comprises:
a source of light for illuminating said scene;
a plate having a transmissiveness which varies with said single periodic pattern in a first direction; and
means for moving said plate along said first direction between said light source and said scene.

6. Apparatus as in claim 5 wherein said transmissiveness pattern varies sinusoidally.

7. Apparatus as in claim 5 wherein said plate has transmissive regions separated by opaque regions in said direction.

8. Apparatus as in claim 1 or 4 wherein said illuminating means comprises:
a source of light for illuminating said scene;
a disk having a transmissiveness that varies with said periodic pattern circumferentially; and
means for rotating said disk between said light source and said scene.

9. Apparatus as in claim 8 wherein said transmissiveness pattern varies sinusoidally.

10. Apparatus as in claim 8 wherein said disk has transmissive regions separated by opaque regions in a circumferential direction.

11. Apparatus for creating an image of a scene, said image including a plurality of pixels, each pixel being associated with an area of said scene, said apparatus comprising:
a source of light for illuminating said scene;
means, offset from the axis between said light source and said scene, for generating intensity values for each of said pixels related to the amount of light reflected from said scene;
means for modulating said light source to produce a single continuously moving, periodic pattern on said scene;
means for obtaining first and second sets of values related to the intensity values for each of said pixels, said second set of values being obtained when said periodic pattern has shifted one-quarter cycle; and
means for determining the angle of the vector formed by said first and second sets for each of said pixels, said angle being indicative of relative range.

12. Apparatus for creating an image of a scene, said image including a plurality of pixels, each pixel being associated with an area of said scene, said apparatus comprising:
a source of light for illuminating said scene;
means, offset from the axis between said light source and said scene, for generating intensity values for each of said pixels related to the amount of light reflected from said scene;
means for modulating said light source to produce a single continuously moving, periodic pattern on said scene;
means for obtaining first, second, third and fourth frames of values from said generating means such that said moving pattern shifts in phase with respect to said pattern by one-quarter cycle between consecutive frames;
means for taking the difference between said values of each of said pixels in said first and third frames, and the difference between said values of each of said pixels in said second and fourth frames; and
means for determining the angle of the vector formed by said differences for each of said pixels, said angle being indicative of relative range.

13. Apparatus as in claim 12 wherein said obtaining means, taking means and determining means includes a digital computer.

14. Apparatus for creating an image of a scene, said image including a plurality of pixels, each pixel being associated with an area of said scene, said apparatus comprising:
a source of light for illuminating said scene;
means, offset from the axis between said light source and said scene, for generating intensity values for each of said pixels related to the amount of light reflected from said scene;
means for modulating said light source to produce a single continuously moving, periodic pattern on said scene;
first means for storing a first frame of said values;
second means for storing a second frame of said values;
third means for storing a third frame of said values;
fourth means for storing a fourth frame of values, said moving pattern having shifted in phase with respect to said pattern by 90° between consecutive frames;
first means for determining the differences between said intensity values for each of said pixels in said first and third frames;
second means for determining the differences between said intensity values for each of said pixels in said second and fourth frames; and
means for determining the arc tangent of the quotient of output signals of said first and second determining means for each of said pixels, said arc tangent being indicative of relative range.

15. Apparatus as in claim 4 or 14 further comprising means for summing said intensity values for each of said pixels, said sum being indicative of the intensity of light reflected from each of said pixels.

16. Apparatus as in claim 14 wherein said first difference determining means, said second difference determining means and said arc tangent determining means includes a digital computer.

17. Apparatus as in claim 12 or 14 wherein said modulating means includes:

a disk having a transmissiveness that varies with said periodic pattern circumferentially; and means for rotating said disk between said light source and said scene.

18. Apparatus as in claim 17 wherein said transmissiveness pattern varies sinusoidally.

19. Apparatus as in claim 17 wherein said disk has transmissive regions separated by opaque regions in a circumferential direction.

20. Apparatus as in claim 17 wherein:

said disk has a transmissiveness that varies circumferentially with two periodic, superimposed patterns, one of said patterns having a frequency higher than the other said patterns; and said apparatus includes means for generating relative coarse and fine range data.

21. Apparatus as in claim 11 or 14 further comprising:

second means for modulating said light source, said second modulating means producing a periodic pattern having a lower frequency than said modulating means; and means, responsive to intensity values while said second modulation means is actuated, for producing coarse, relative range data.

22. Apparatus for creating an image of a scene, said image including a plurality of pixels, each pixel being associated with an area of said scene, said apparatus comprising:

a source of light for illuminating said scene;

means, offset from the axis between said light source and said scene, for generating intensity values for each of said pixels related to the amount of light reflected from said scene;

means for modulating said light source to produce a single continuously moving, periodic pattern on said scene;

first means for storing a frame of said values;

second means for storing a frame of said values;

control means for causing (1) a first frame of said values to be stored in said first storing means, (2) a second frame of said values to be stored in said second storing means, (3) said values in said first storing means to be read out and subtracted from corresponding pixels in a third frame, the differences being stored in said first storing means, and (4) said values in said second storing means to be read out and subtracted from corresponding pixels in a fourth frame, the differences being stored in said second storing means, said moving pattern having shifted in phase with respect to said pattern by 90° between consecutive frames; and means for determining the arc tangent of the quotient of output signals of said first and second storing means for each of said pixels, said arc tangent being indicative of relative range.

23. Apparatus as in claim 1, 12 or 22 wherein said periodic pattern is substantially sinusoidal.

24. Apparatus as in claim 11 or 22 wherein said modulating means includes:

a plate having a transmissiveness which varies with said single periodic pattern in a first direction; and means for moving said plate along said first direction.

25. Apparatus as in claim 24 wherein said transmissiveness pattern varies sinusoidally.

26. Apparatus as in claim 24 wherein said plate has transmissive regions separated by opaque regions in said direction.

27. Apparatus as in claim 24 wherein:

said plate has a transmissiveness that varies in said direction according to two periodic superimposed patterns, one of said patterns having a higher frequency than the other of said patterns; and said apparatus includes means for generating coarse and fine range data.

28. Apparatus as in claim 11 or 22 wherein:

said modulating means includes means for modulating said light source to produce two moving periodic patterns on said scene, one of said periodic patterns having a frequency greater than the other periodic pattern; and said apparatus includes means for generating relative coarse and fine range data.

29. Apparatus as in claim 4, 11 or 22 wherein said generating means includes an electronic camera.

30. Apparatus as in claim 22 wherein said control means and said determining means includes a digital computer.

31. Apparatus as in claim 14 or 22 wherein said moving periodic pattern shifts one complete cycle for every four frames of intensity values generated by said generating means.

32. A method for imaging a scene comprising the steps of:

illuminating said scene with a single moving periodic modulation pattern;

monitoring the intensity of light reflected from a plurality of points in said scene from an angle offset from the axis of illumination; and determining the relative phase with respect to said periodic modulation pattern of light reflected from each of said points in said scene using a plurality of light intensities from said monitoring step for each of said points monitored at different times, said relative phase being related to the relative range of said points.

33. A method for creating an image of a scene, said image including a plurality of pixels, each pixel being associated with an area of said scene, said method comprising the steps of:

illuminating said scene with a single moving periodic modulation pattern;

monitoring the intensity of light reflected from said scene for each of said pixels at an angle offset from the axis of illumination; and determining the relative phase with respect to said periodic modulation pattern of light reflected from each of said areas in said scene using intensity values for each of said pixels monitored at different phase positions of said periodic modulation pattern, said relative phase being related to the relative ranges of said areas.

34. A method for creating an image of a scene, said image including a plurality of pixels, each pixel being associated with an area of said scene, said method comprising the steps of:

illuminating said scene with a single moving periodic modulation pattern;

monitoring the intensity of light reflected from said scene for each of said pixels at an angle offset from the axis of illumination;

generating a first set of values related to the monitored intensity values;

generating a second set of values related to the intensity values when said periodic pattern has shifted one-quarter cycle with respect to said first step generating step; and determining the angle of the vector formed by said values from said first and second sets for each of said pixels, said angle being indicative of relative range.

35. A method for creating an image of a scene, said image including a plurality of pixels, each pixel being associated with an area of said scene, said method comprising the steps of:
    illuminating said scene with a single moving periodic modulation pattern;
    monitoring the amount of light reflected from said scene for each of said pixels at an angle offset from the illumination axis;
    obtaining first, second, third and fourth sets of intensity values for each of said pixels, said moving pattern having shifted in phase by one-quarter cycle between the monitoring of each of said sets of values;
    subtracting said values of each of said pixels in said third set from said first set, and subtracting said values of each of said pixels in said fourth set from said second set; and
    determining the angle of the vector formed by the results of said subtracting steps for each of said pixels, said angle being indicative of relative range.

36. A method for creating an image of a scene, said image including a plurality of pixels, each pixel being associated with an area of said scene, said method comprising the steps of:
    illuminating said scene with a single moving periodic modulation pattern;
    monitoring the intensity of light reflected from said scene for each of said pixels at an angle offset from the axis of illumination;
    storing four frames of intensity values, said moving pattern having shifted in phase by one-quarter cycle between consecutive frames;
    subtracting intensity values for each of said pixels in a third frame from values in a first frame;
    subtracting intensity values for each of said pixels in a fourth frame from intensity values in a second frame; and
    determining the angle of the vector formed by the results of said subtracting steps for each of said pixels, said angle being indicative of relative range.

37. A method as in claim 34 or 36 wherein:
    said illuminating step includes the step of illuminating said scene with first and second moving periodic modulation patterns, said patterns moving at the same frequency, said first pattern having a longer period than said second pattern; and
    said method further comprises the step of processing frames of intensity values to obtain coarse and fine range data.

38. A method as in claim 33, 34 or 36 further comprising the step of summing said intensity values for corresponding pixels, said sum being indicative of the intensity of light reflected from each of said pixels.

39. A method for creating an image of a scene, said image including a plurality of pixels, each pixel being associated with an area of said scene, said method comprising the steps of:
    illuminating said scene with a single moving periodic modulation pattern;
    monitoring the intensity of light reflected from said scene for each of said pixels at an angle offset from the axis of illumination;
    storing a first frame of values in a first memory;
    storing a second frame of values in a second memory;
    reading out values stored in said first memory and subtracting intensity values of corresponding pixels of a third frame from intensity values of said first frame as intensity values for said third frame are being monitored;
    reading out intensity values stored in said second memory and subtracting intensity values of corresponding pixels in a fourth frame from intensity values of said second frame as intensity values for said fourth frame are being monitored;
    said moving pattern having shifted in phase by one-quarter cycle between consecutive frames; and
    determining the arc tangent of the quotient of the results of said subtracting steps for each of said pixels, said arc tangent being indicative of relative range.

40. A method as in claim 32, 34, 35 or 39 wherein said periodic modulation pattern is sinusoidal.

41. A method as in claim 35 or 39 wherein:
    said illuminating step includes the step of illuminating said scene with first and second moving periodic modulation patterns, said first and second modulation patterns moving at different frequencies and having different periods; and
    said method further comprises the step of processng frames of intensity values to obtain coarse and fine range data.

42. A method as in claim 35, 36 or 39 wherein said pattern shifts one complete cycle for every four frames of intensity values monitored in said monitoring step.

* * * * *